United States Patent [19]
Ahn

[11] Patent Number: 6,038,429
[45] Date of Patent: Mar. 14, 2000

[54] CITIZEN'S BAND RADIO WITH IMPROVED RECEPTION

[75] Inventor: Thomas I. Ahn, Glen Ellyn, Ill.

[73] Assignee: Cobra Electronics Corporation, Chicago, Ill.

[21] Appl. No.: 08/726,706

[22] Filed: Oct. 7, 1996

[51] Int. Cl.[7] .................................................. H04B 1/00
[52] U.S. Cl. ............................ 455/72; 455/84; 455/296
[58] Field of Search .................................. 455/73, 76, 82, 455/83, 86, 84, 296, 314, 72

[56] References Cited

U.S. PATENT DOCUMENTS

| | | | |
|---|---|---|---|
| 4,048,561 | 9/1977 | Wilcox et al. | 455/83 |
| 4,153,877 | 5/1979 | Fathauer et al. | 455/76 |
| 4,156,193 | 5/1979 | Baker | 455/76 |
| 4,317,220 | 2/1982 | Martin | 455/72 |
| 5,493,698 | 2/1996 | Suzuki et al. | 455/72 |
| 5,640,685 | 6/1997 | Komoda | 455/72 |
| 5,655,003 | 8/1997 | Erving et al. | 455/434 |

*Primary Examiner*—Daniel S. Hunter
*Assistant Examiner*—Darnell R. Armstrong
*Attorney, Agent, or Firm*—Wallenstein & Wagner, Ltd.

[57] ABSTRACT

A method and apparatus for improving the signal-to-noise ratio of a citizen's band (CB) radio is disclosed. A compander circuit is used in both the transmitting and receiving portions of the citizen's band radio. Demodulated incoming audio signals are expanded by the compander circuit to increase the dynamic range of the incoming audio signals. Outgoing audio signals from a microphone are compressed by the compander circuit to decrease the dynamic range of the outgoing audio signals before they are amplified and transmitted.

7 Claims, 1 Drawing Sheet

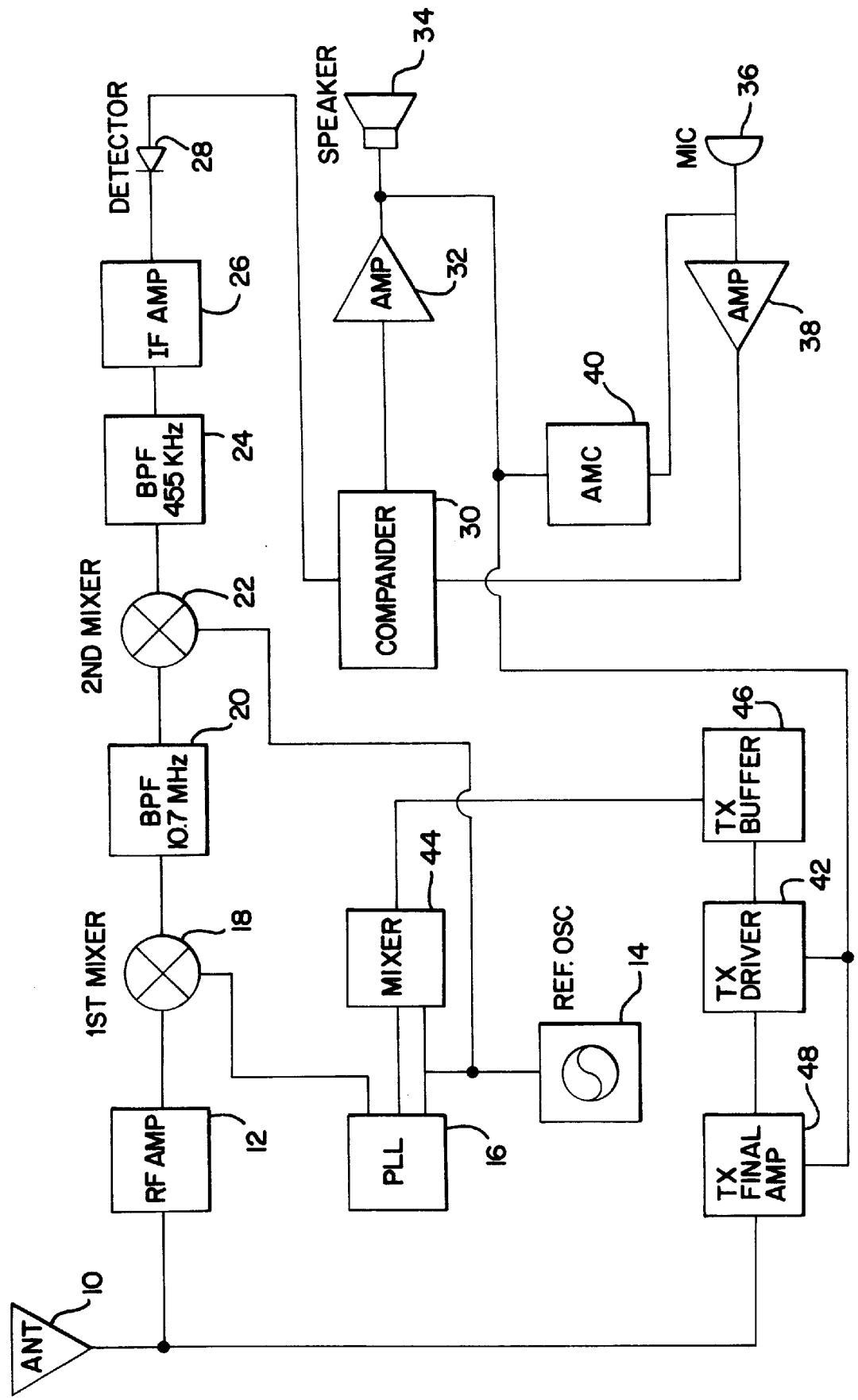

CITIZEN'S BAND RADIO WITH IMPROVED RECEPTION

DESCRIPTION

1. Technical Field

The present invention relates generally to two-way citizen's band radio communications and more particularly to improving the signal-to-noise ratio in a citizen's band radio.

2. Background of the Invention

It is known that the signal-to-noise ratio in a two-way radio system affects the quality of the audio communications. When an audio signal is amplified during transmission and reception, the noise in the signal is also amplified. By narrowing the dynamic range of the signal to be amplified, the noise that is amplified can be reduced.

It is also known that a compander circuit can be used to improve the signal to noise ratio of an audio signal. A compander operates in a transmitter to compress audio signals before they are transmitted. A compander in a receiver then expands the audio signals after they are received. The compressor portion of the compander reduces the dynamic range of the signals by imparting more gain to low-intensity signals than to high-intensity signals. As a result of amplifying the weak signals more than the strong signals, the signal-to-noise ratio is improved. The expander portion of the compander does the reverse of the compressor circuit by restoring a compressed signal to it original dynamic range.

Companders are known to improve the signal-to-noise ratio in telephone communications, and they are used in such devices as cordless telephones and cellular telephones. However, to the inventor's knowledge there has not been disclosed heretofore a method or apparatus which combines a citizen's band radio, with the signal-to-noise ratio improvements of a compander circuit. The quality of the signal of a citizen's band radio like all two-way radios depends upon the signal-to-noise ratio of the radio's transmitter and receiver. Hence there is a particular need for a device and method capable of improving the signal-to-noise ratio in two-way and citizen's band radios.

The present invention is provided to overcome these and other problems of the prior art.

SUMMARY OF THE INVENTION

It is an object of the present invention to provide a method and device for improving the signal-to-noise ratio of a citizen's band radio with a compander circuit by expanding the dynamic range of incoming audio signals after reception and demodulation and compressing the dynamic range of outgoing audio signals before modulation and transmission.

In accordance with the invention, a communication signal is received by a CB radio and demodulated into an audio signal. The audio signal then passes through the expander portion of a compander circuit. The audio signal is expanded resulting in an increase in the dynamic range of the audio signal and an improved signal-to-noise ratio. The expanded audio signal is then converted into an audible message by a speaker.

In accordance with a further aspect of the invention, an audible message is converted into an audio signal by a microphone. The audio signal then passes through the compressor portion of a compander circuit. The compressed audio signal is then mixed with a carrier signal to create a communication signal and the communication signal is transmitted to other two-way CB radios.

BRIEF DESCRIPTION OF THE DRAWINGS

FIG. 1 is a schematic of a two-way communication radio circuit of the present invention using a compander.

DETAILED DESCRIPTION

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

A citizen's band (CB) radio circuit, generally designated 6, is shown in FIG. 1. The circuit 6 generally has two portions, a receiver portion and a transmitter portion. As is well known, a CB radio operates in the frequency range of 26 MHz to 27 MHz.

For purposes of illustration and discussion, a single CB radio having a receiver portion and a transmitter portion is shown. It should be understood that when discussing the transmitting function, that the signal is to be transmitted to another CB radio, and that when discussing the receiving function, that the signal is to be received from another CB radio.

In the receiver portion of the radio, incoming RF communication signals are received by an antenna 10 and the received signals are then amplified by an RF amplifier 12. A reference oscillator 14 produces a reference signal of 10.24 MHz which passes through a phase locked loop circuit 16. The outputs of the RF amplifier 12 and the phase locked loop circuit 16 are then mixed in a first mixer 18. The output of the first mixer 18 is filtered by a 10.7 MHz band pass filter 20 and then mixed with the 10.24 MHz reference signal in a second mixer 22. The output signal of the second mixer 22 is filtered by a 455 KHz band pass filter 24 and amplified by an IF amplifier 26. The output signal of the IF amplifier 26 passes through a detector 28 to create an incoming audio signal.

The incoming audio signal is expanded in the expander portion of a compander circuit 30 and amplified by an amplifier 32 to produce an incoming audio message at a speaker 34. The compander circuit 30 can be a model number TA31101, distributed by Toshiba America Electronic Components, Inc., or a model number MC33110, distributed by Motorola, Inc.

In the transmitter portion of the radio, an outgoing audio message is converted to an outgoing audio signal by a microphone 36 and then amplified by an amplifier 38. The amplified outgoing audio signal is compressed by the compressor portion of a compander circuit 30 and amplified by an amplifier 32. The compressed outgoing audio signal is then sensed by an automatic microphone gain control circuit 40 and input into a transmitter driver 42. A mixer 44 mixes the 10.24 MHz reference signal with the output of the phase locked loop 16 to produce a carrier signal. The carrier signal passes through transmitter buffer 46 and then is mixed with the compressed outgoing audio signal in the transmitter driver 42 to create an AM modulation for an outgoing RF communication signal. The outgoing RF communication signal is amplified in the transmitter final amplifier 48 and broadcast by the antenna 10.

A citizen's band radio without the compander circuit generally has a signal-to-noise ratio of 35–40 dB, at 1000 $\mu$V, 30% modulation. By using the compander circuit, the signal-to-noise ratio of a citizen's band radio has been shown to be improved to 50–55 dB. It is not required that both the transmitting and receiving radios have the compander circuitry in order to achieve improvement in the signal-to-noise ratio. However, the best results are obtained when both radios use the compander circuit.

While the specific embodiment has been illustrated and described, numerous modifications come to mind without significantly departing from the spirit of the invention and the scope of protection is only limited by the scope of the accompanying claims.

I claim:

1. An apparatus for receiving a citizen's band (CB) radio communication signal comprising:
   an antenna which receives an uncompressed incoming CB radio communication signal within a frequency range of about 26 MHz to about 27 MHz;
   an RF amplifier which amplifies the uncompressed incoming communication signal to provide an amplified uncompressed incoming communication signal;
   a CB receiver operably connected to said RF amplifier and which demodulates said amplified uncompressed incoming communication signal into an uncompressed incoming audio signal, the receiver including a phase locked loop responsive to a reference oscillator and operably connected to a mixer which receives said uncompressed incoming communication signal;
   a detector responsive to the uncompressed incoming audio signal to provide a detected uncompressed incoming audio signal;
   a compander operably connected to said detector and which expands said detected incoming uncompressed audio signal; and
   a speaker operably connected to said compander and which converts said expanded detected incoming uncompressed audio signal into an audible message.

2. The receiving apparatus of claim 1 wherein the receiver comprises:
   a first amplifier connected to said antenna for amplifying said incoming communication signal;
   a reference oscillator for producing a reference signal;
   a first mixer which mixes said amplified communication signal with said reference signal;
   a first band pass filter which filters an output signal of said first mixer;
   a second mixer which mixes an output signal of said first band pass filter with said reference signal;
   a second band pass filter which filters an output signal of said second mixer;
   a second amplifier which amplifies an output signal of said second band pass filter;
   a detector which demodulates an output of said second amplifier to produce an audio signal.

3. An apparatus for transmitting a citizen's band (CB) radio communication signal comprising:
   a microphone for converting an audible message into an outgoing audio signal;
   an amplifier responsive to the outgoing audio signal to provide an amplified outgoing audio signal;
   a compander operably connected to said amplifier for compressing said amplified outgoing audio signal;
   a transmitter operably connected to said commander which modulates said compressed outgoing audio signal into a compressed outgoing communication signal, the transmitter including a transmitter driver responsive to said compander and a phase locked loop;
   a transmitter amplifier responsive to the compressed outgoing communication signal to provide an amplified compressed outgoing communication signal; and
   an antenna operably connected to said transmitter amplifier which broadcasts said amplified compressed outgoing communication signal within a frequency range of about 26 MHz to about 27 MHz and suitable for receipt by a citizen's band radio lacking a compander for expanding said amplified compressed outgoing communication signal.

4. The transmitting apparatus of claim 3 wherein the transmitter comprises:
   a reference oscillator for producing a reference signal;
   a transmitter driver which mixes said reference signal with said compressed outgoing audio signal to produce modulation for said outgoing communication signal; and
   a transmitter amplifier connected to said antenna which amplifies said outgoing CB radio communication signal produced by said transmitter driver.

5. A two-way citizen's band (CB) radio communication system comprising:
   a CB transmitter including a microphone which converts an outgoing audible message into an outgoing audio signal, an amplifier responsive to the outgoing audio signal to provide an amplified outgoing audio signal, a compander operably connected to said amplifier and having a compressing portion, wherein said compressing portion compresses said amplified outgoing audio signal, a CB modulator operably connected to said compander which modulates said amplified compressed outgoing audio signal to create an outgoing communication signal, a transmitter amplifier responsive to the outgoing communication signal to provide an amplified outgoing communication signal and an antenna operably connected to said transmitter amplifier and which broadcasts said amplified outgoing communication signal within a frequency range of about 26 MHz to about 27 MHz; and
   a receiver including a compander having an expanding portion, the receiver including means for demodulating an incoming unexpanded communication signal to create an incoming audio signal, said demodulating means include a phase locked loop responsive to a reference oscillator and operably connected to a mixer which receives said incoming unexpanded communication signal wherein said incoming audio signal is expanded by said compander expanding portion, an amplifier responsive to the expanded incoming audio signal to provide an amplified expanded incoming audio signal and a speaker which converts said amplified expanded incoming audio signal into an incoming audible message.

6. A method of improving the signal-to-noise ratio of a citizen's band communication radio signal comprising the steps of:
   providing a receiver having a compander circuit operably connected between an antenna and a speaker;
   receiving with said antenna an uncompressed citizen's band radio signal within a frequency range of about 26 MHz to about 27 MHz;
   amplifying said received uncompressed citizens band radio signal to create an amplified uncompressed citizen's band radio signal;
   demodulating said amplified uncompressed citizen's band radio signal to create an uncompressed incoming audio signal;

mixing said uncompressed citizen's band radio signal with a phase locked loop output during the demodulation step;

detecting said uncompressed incoming audio signal to produce a detected uncompressed incoming audio signal;

expanding said detected uncompressed incoming audio signal with said compander circuit;

amplifying said expanded detected incoming audio signal to produce an amplified expanded incoming audio signal; and converting said amplified expanded incoming audio signal into an audible message.

7. A method of improving the signal-to-noise ratio of a citizen's band (CB) communication radio signal comprising the steps of:

providing a transmitter having a compander circuit operably connected between a microphone and an antenna;

converting with said microphone an audible message into an outgoing audio signal;

amplifying said outgoing audio signal to provide an amplified outgoing audio signal;

compressing said amplified outgoing audio signal in a compander circuit;

modulating said compressed outgoing audio signal with a carrier signal to create an outgoing CB radio communication signal within a frequency range of about 26 MHz to about 27 MHz;

mixing a reference signal with a phase locked loop output to produce said carrier signal; and amplifying said outgoing CB radio communication signal with an amplifier to provide an amplified outgoing CB radio communication signal.

* * * * *

UNITED STATES PATENT AND TRADEMARK OFFICE
CERTIFICATE OF CORRECTION

PATENT NO.    : 6,038,429
DATED         : March 14, 2000
INVENTOR(S)   : Thomas I. Ahn It is certified that errors appear in the above-identified patent and that said Letters Patent is hereby corrected as shown below:

Col. 3, line 63, delete "commander" and insert therefor --compander--

Signed and Sealed this

Tenth Day of April, 2001

NICHOLAS P. GODICI

*Attest:*

*Attesting Officer*        Acting Director of the United States Patent and Trademark Office